US012736237B2

(12) United States Patent
Zou

(10) Patent No.: US 12,736,237 B2
(45) Date of Patent: Sep. 15, 2026

(54) COLD AND HOT DUAL-FUNCTIONAL ATOMIZATION STRUCTURE OF HUMIDIFIER

(71) Applicant: Shenzhen Xianma Technology Co., Ltd, Shenzhen (CN)

(72) Inventor: Weiquan Zou, Xinhua (CN)

(73) Assignee: Shenzhen Xianma Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/540,633

(22) Filed: Feb. 14, 2026

(65) Prior Publication Data

US 2026/0177256 A1 Jun. 25, 2026

(30) Foreign Application Priority Data

Jan. 28, 2026 (CN) ......................... 202610121823.2

(51) Int. Cl.

| | |
|---|---|
| ***F24F 6/12*** | (2006.01) |
| ***B05B 17/06*** | (2006.01) |
| ***F24F 6/00*** | (2006.01) |
| ***F24F 13/30*** | (2006.01) |

(52) U.S. Cl.

CPC ............ *F24F 6/12* (2013.01); *B05B 17/0615* (2013.01); *F24F 13/30* (2013.01); *B05B 17/06* (2013.01); *F24F 2006/008* (2013.01); *F24F 2221/54* (2013.01)

(58) Field of Classification Search

CPC .......... F24F 2006/008; F24F 6/12; F24F 6/14; F24F 6/16; F24F 2006/143; F24F 13/30; F24F 2221/54; B05B 17/06; B05B 17/0607; B05B 17/0615; A61M 16/0069; A61M 16/026; A61M 16/1075; A61M 16/161

See application file for complete search history.

(56) References Cited

U.S. PATENT DOCUMENTS

| | | | |
|---|---|---|---|
| 2011/0168805 | A1 | 7/2011 | Hsieh et al. |
| 2020/0370526 | A1 | 11/2020 | Teng et al. |
| 2021/0186112 | A1 | 6/2021 | Wang et al. |

FOREIGN PATENT DOCUMENTS

| | | | | | |
|---|---|---|---|---|---|
| CN | 213480466 | U | * | 6/2021 | F24F 6/12 |
| CN | 113324301 | A | * | 8/2021 | F24F 6/12 |
| EP | 1099911 | A1 | * | 5/2001 | F24F 6/12 |
| KR | 20140005025 | A | * | 1/2014 | B82Y 40/00 |

OTHER PUBLICATIONS

English-language translation of Chun et al. (KR-20140005025-A), Foreign Patent Document (Year: 2014).*

* cited by examiner

*Primary Examiner* — Darren W Gorman
(74) *Attorney, Agent, or Firm* — Hemisphere Law, PLLC

(57) ABSTRACT

A cold and hot dual-functional atomization structure of a humidifier is provided, and relates to the technical field of atomizers. The atomization structure includes a water tank, where an interior of the water tank is partitioned into two parts such as a water replenishing tank and an atomization tank, a bottom of the atomization tank is provided with an ultrasonic atomizer, a top of the water tank is provided with a tank cover, a top of the tank cover is provided with a heat conduction pipe, and the heat conduction pipe is in communication with the atomization tank. The present disclosure has the following beneficial effects: cold and hot dual-functional atomization is implemented, an electric heating temperature is adjustable, and different use requirements are adapted.

4 Claims, 3 Drawing Sheets

COLD AND HOT DUAL-FUNCTIONAL ATOMIZATION STRUCTURE OF HUMIDIFIER

TECHNICAL FIELD

The present disclosure relates to the technical field of humidifiers, in particular to a cold and hot dual-functional atomization structure of a humidifier.

BACKGROUND

As people's living standards rise, the regulation of indoor air quality has received increasing attention. As a key device for maintaining indoor humidity within a comfortable range, humidifiers have been widely used in various scenarios such as households, offices, and factory buildings. Humidifiers with cold fog and hot fog output functions have become one of mainstream development directions on the market because the humidifiers can adapt to the needs of different seasons and different groups of people. For example, cold fog is needed for cooling and humidification in summer, and hot fog is needed for warming and humidification in winter.

At present, an atomization structure of an existing cold and hot dual-functional humidifier mainly has the following technical defects, which severely impact user experience and product competitiveness:

First, most products adopt a design with dual water tanks or separate cold and hot fog generation units, resulting in a complex overall structure and large volume. Moreover, a heat insulation design between water tanks or between cold and hot air passages is imperfect, which easily leads to heat conduction. For example, heat from a hot water tank may transfer to a water storage tank, so that a temperature of an instrument on a circulation path rises abnormally, and a service life of a device is shortened after long-term use.

Second, in the prior art, cold and hot dual-functional atomization adopts a structure in which cold fog is implemented by cooling after heating and atomization, resulting in low cold fog atomization efficiency, slow fog output, and high energy consumption for hot fog heating. It is difficult to achieve an energy-saving target while maintaining a good user experience.

In view of the foregoing deficiencies in the prior art, there is an urgent need for a cold and hot dual-functional atomization structure that is compact in design, excellent in heat insulation effect, low in noise, convenient to switch, energy-saving, and high in efficiency, so as to fill blanks in the prior art.

SUMMARY

An objective of the present disclosure is to provide a cold and hot dual-functional atomization structure of a humidifier, and aims to solve the foregoing technical problems existing in the prior art.

To achieve the foregoing objective, the present disclosure adopts the following technical solutions:

A cold and hot dual-functional atomization structure of a humidifier includes a water tank, where an interior of the water tank is partitioned into two parts such as a water replenishing tank and an atomization tank, a bottom of the atomization tank is provided with an ultrasonic atomizer, a top of the water tank is provided with a tank cover, a top of the tank cover is provided with a heat conduction pipe, the heat conduction pipe is in communication with the atomization tank, an outer surface of the heat conduction pipe is provided with an electric heating apparatus, the top of the tank cover is provided with an exhaust fan at a position corresponding to the atomization tank, air is blown into the atomization tank by using the exhaust fan, the ultrasonic atomizer atomizes water into cold fog, the cold fog is blown into the heat conduction pipe by using the exhaust fan, and the cold fog is exhausted through a fog outlet in a top of the heat conduction pipe after heated by using the electric heating apparatus.

Further, the water tank includes a tank body, a bottom of an inner wall of the tank body is provided with a guide cylinder with a C-shaped cross section, a top of the guide cylinder is in communication with a bottom of the heat conduction pipe, guide plates are fixedly connected to two vertical sides of the guide cylinder, one side of the guide plate is fixedly connected to an inner corner edge of the tank body, and the guide cylinder and the two guide plates partition an interior of the tank body into the water replenishing tank and the atomization tank.

Further, the ultrasonic atomizer is fixedly installed at a bottom of the guide cylinder.

Further, an automatic water replenishing apparatus is disposed at any one of the guide plates, and water in the water replenishing tank is replenished into the atomization tank by using the automatic water replenishing apparatus.

Further, a heat shield is shielded on the outside of the electric heating apparatus, and a heat insulation material is filled between the electric heating apparatus and an inner wall of the heat shield.

Further, the electric heating apparatus has an adjustable temperature.

The present disclosure has the following beneficial effects:

firstly, cold and hot dual-functional atomization is implemented, an electric heating temperature is adjustable, and different use requirements are adapted;

secondly, hot fog is formed through heating on the basis of cold fog, and the structure is designed without boiling water and is not prone to burn when toppled over, so that the safety is high;

thirdly, water does not need to be boiled, and only fog is heated, so that the atomization structure is high in heat utilization efficiency, energy-saving and environmentally-friendly;

fourthly, a C-shaped guide cylinder and a guide plate optimize airflow, thereby increasing fog discharge rate and having a simple and reasonable structure;

fifthly, the structure is equipped with an automatic water replenishing apparatus, the atomization structure is easy to use, and a heat shield and a heat insulation material further ensure safety in use; and sixthly, the atomization structure is high in adaptability, and is compatible with most atomization devices such as humidifiers and face steamers on the market.

Figure 1:
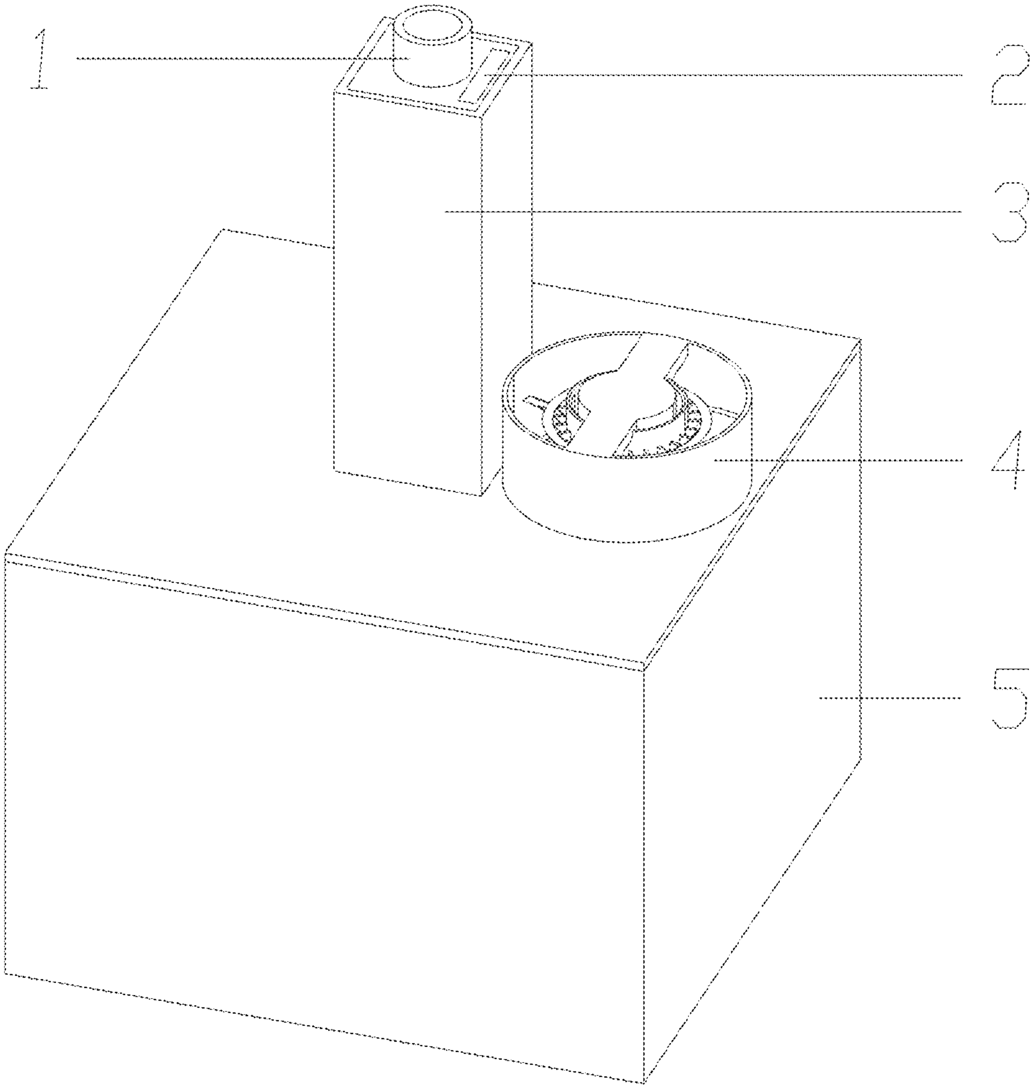
FIG. 1 is a schematic diagram of a three-dimensional structure according to the present disclosure.

Reference numerals: 1: heat conduction pipe; 2: electric heating apparatus; 3: heat shield; 4: exhaust fan; 5: water tank; 501: tank body; 502: guide cylinder; 503: guide plate; 504: tank cover; 6: ultrasonic atomizer; and 7: automatic water replenishing apparatus.

DETAILED DESCRIPTION OF THE EMBODIMENTS

To describe the technical solutions in the embodiments of the present disclosure or in the prior art more clearly, the following briefly describes the accompanying drawings required for describing the embodiments or the prior art. Clearly, the accompanying drawings in the following description show merely some embodiments of the present disclosure, and a person of ordinary skill in the art may derive other drawings from these accompanying drawings without creative efforts. It should be noted that the descriptions of these embodiments are intended to facilitate the understanding of the present disclosure, but do not constitute a limitation thereof.

Embodiments

Figure 2:
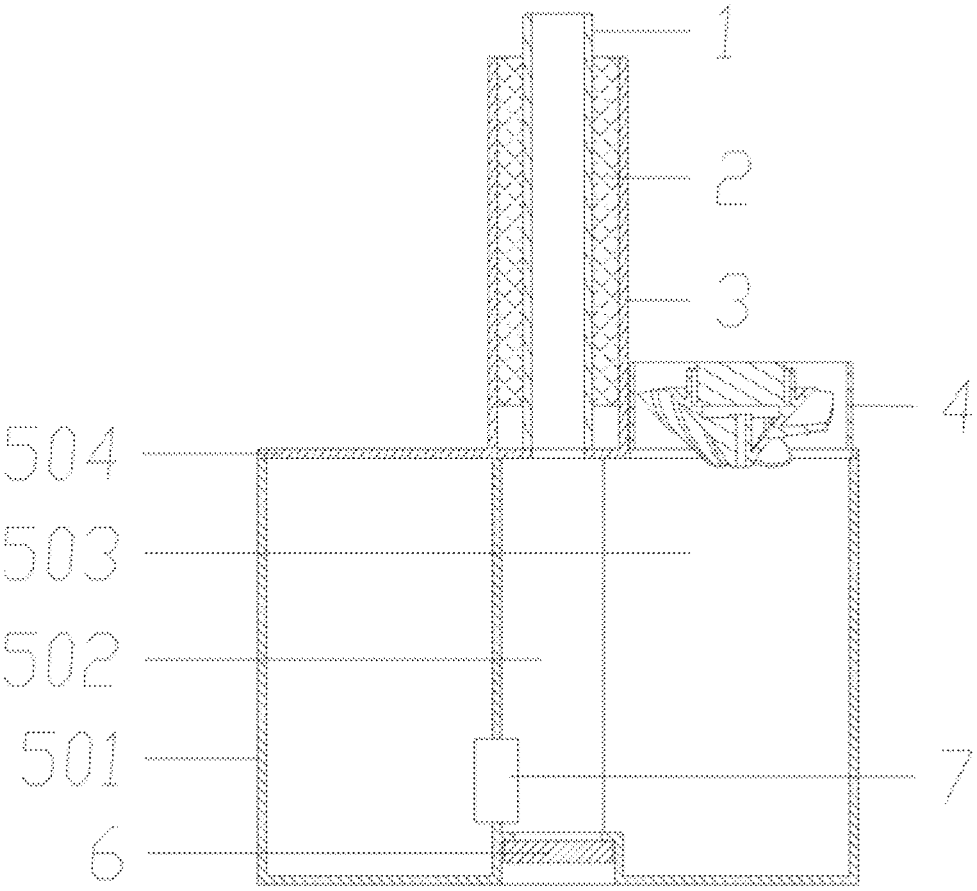
FIG. 2 is a structure diagram of a section-view plane according to the present disclosure.
Figure 3:
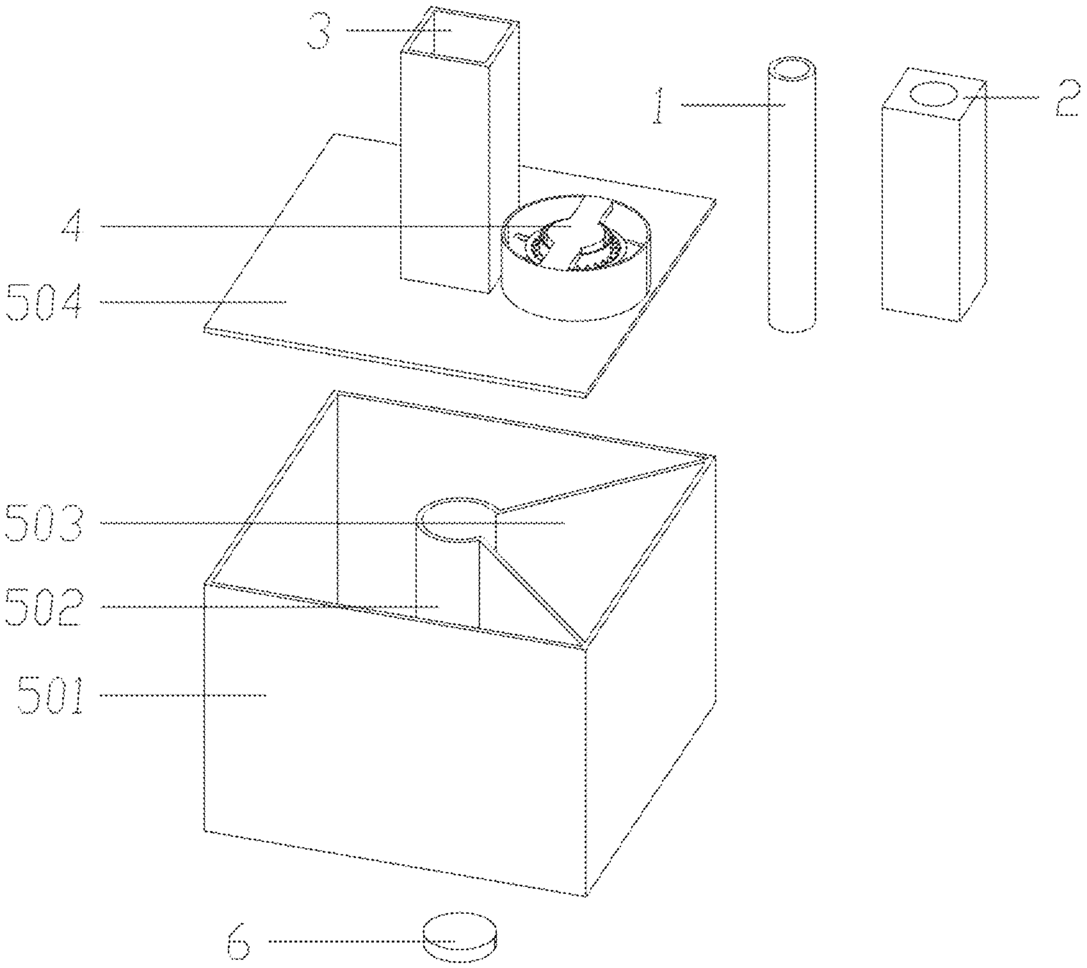
FIG. 3 is a schematic diagram of a solid decomposition structure according to the present disclosure.

As shown in FIG. 1 to FIG. 3, this embodiment provides a cold and hot dual-functional atomization structure of a humidifier, including a water tank 5. An interior of the water tank 5 is partitioned into two parts such as a water replenishing tank 5 and an atomization tank. A bottom of the atomization tank is provided with an ultrasonic atomizer 6. A top of the water tank 5 is provided with a tank cover 504. A top of the tank cover 504 is provided with a heat conduction pipe 1. The heat conduction pipe 1 is in communication with the atomization tank. An outer surface of the heat conduction pipe 1 is provided with an electric heating apparatus 2. The top of the tank cover 504 is provided with an exhaust fan 4 at a position corresponding to the atomization tank. Air is blown into the atomization tank by using the exhaust fan 4. The ultrasonic atomizer 6 atomizes water into cold fog. The cold fog is blown into the heat conduction pipe 1 by using the exhaust fan 4. The cold fog is exhausted through a fog outlet in a top of the heat conduction pipe 4 after heated by using the electric heating apparatus 2.

Specifically, water in the water tank 5 is atomized into cold fog by using the ultrasonic atomizer 6 and then diffused into the atomization tank. Cold air is blown into the atomization tank by using the exhaust fan 4. The cold fog is blown into a bottom of the heat conduction pipe 1. The electric heating apparatus 2 disposed on the outer surface of the heat conduction pipe 1 generates heat. Heat energy rapidly heats the blown cold fog by using the heat conduction pipe 1. Finally, the hot fog is ejected from the fog outlet. The electric heating apparatus 2 has an adjustable temperature, and a heating temperature can be adjusted based on requirements of a user, so that a requirement for adjusting the temperature is met by the user.

In conclusion, the structure is completely adaptively compatible with most atomization devices such as humidifiers and face steamers on the market.

This atomization structure differs from an existing hot fog atomization structure available on the market, which primarily generate fog by boiling water. This apparatus directly heats cold fog produced by atomization. When the structure is toppled over accidentally, since the fog is generated from cold water, the user cannot be scalded. The temperature at the fog outlet cannot be excessively high, thereby effectively preventing scalding. Furthermore, this apparatus is energy-saving and environmentally-friendly. Water does not need to be boiled, the hot fog passes through the electric heating apparatus 2 only when the hot fog needs to be heated, so that heat energy is fully utilized without waste, and the structure is simple and reasonable.

A bottom of an inner wall of the tank body 501 of the water tank 5 is provided with a guide cylinder 502 with a C-shaped cross section. A top of the guide cylinder 502 is in communication with a bottom of the heat conduction pipe 1. Guide plates 503 are fixedly connected to two vertical sides of the guide cylinder 502. One side of the guide plate 503 is fixedly connected to an inner corner edge of the tank body 501. The guide cylinder 502 and the two guide plates 503 partition an interior of the tank body 501 into the water replenishing tank 5 and the atomization tank. The ultrasonic atomizer 6 is fixedly installed at a bottom of the guide cylinder 502. An automatic water replenishing apparatus 7 is disposed at any one of the guide plates 503. Water in the water replenishing tank 5 is replenished into the atomization tank by using the automatic water replenishing apparatus 7.

Specifically, as shown in FIG. 3, the atomization tank in a triangular prism shape is surrounded by the guide cylinder 502, the two guide plates 503, and part of the tank body 501. The exhaust fan 4 blows air into a wide area, and the generated fog is rapidly concentrated toward a narrow position, which sequentially increases the fog transmission rate and helps improve the fog output rate of the device.

Further, a heat shield 3 is shielded on the outside of the electric heating apparatus 2, and a heat insulation material is filled between the electric heating apparatus 2 and an inner wall of the heat shield 3. Therefore, the heat insulation performance of the structure is further improved, so that the structure is safer and more reliable in the using process.

In summary, it should be noted that what is described above is merely example embodiments of the technical solutions of this application, but is not intended to limit the protection scope of the present disclosure. Any modification, equivalent replacement, or improvement made without departing from the spirit and principle of the present disclosure shall fall within the protection scope of the present disclosure.

What is claimed is:

1. A cold and hot dual-functional atomization structure of a humidifier, comprising a water tank, wherein an interior of the water tank is partitioned into a water replenishing tank and an atomization tank, a bottom of the atomization tank is provided with an ultrasonic atomizer, a top of the water tank is provided with a tank cover, a top of the tank cover is provided with a heat conduction pipe, the heat conduction pipe is in communication with the atomization tank, an outer surface of the heat conduction pipe is provided with an electric heating apparatus, the top of the tank cover is provided with an exhaust fan at a position corresponding to the atomization tank, air is blown into the atomization tank by using the exhaust fan, the ultrasonic atomizer atomizes water into cold fog, the cold fog is blown into the heat conduction pipe by using the exhaust fan, and the cold fog is exhausted through a fog outlet in a top of the heat conduction pipe after heated by using the electric heating apparatus;

wherein the water tank comprises a tank body, a bottom of an inner wall of the tank body is provided with a guide cylinder with a C-shaped cross section, a top of the guide cylinder is in communication with a bottom of the heat conduction pipe, two guide plates are respectively fixedly connected to two vertical sides of the guide cylinder, one side of each guide plate is fixedly connected to an inner corner edge of the tank body, and the guide cylinder and the two guide plates partition an interior of the tank body into the water replenishing tank and the atomization tank.

2. The cold and hot dual-functional atomization structure of a humidifier according to claim 1, wherein the ultrasonic atomizer is fixedly installed at a bottom of the guide cylinder.

3. The cold and hot dual-functional atomization structure of a humidifier according to claim 1, wherein a heat shield is shielded on the outside of the electric heating apparatus, and a heat insulation material is filled between the electric heating apparatus and an inner wall of the heat shield.

4. The cold and hot dual-functional atomization structure of a humidifier according to claim 1, wherein the electric heating apparatus has an adjustable temperature.

* * * * *